I. A. MANN, DEC'D.
M. P. MANN, EXECUTRIX.
PIPE CONNECTION.
APPLICATION FILED AUG. 17, 1915.
1,277,975. Patented Sept. 3, 1918.
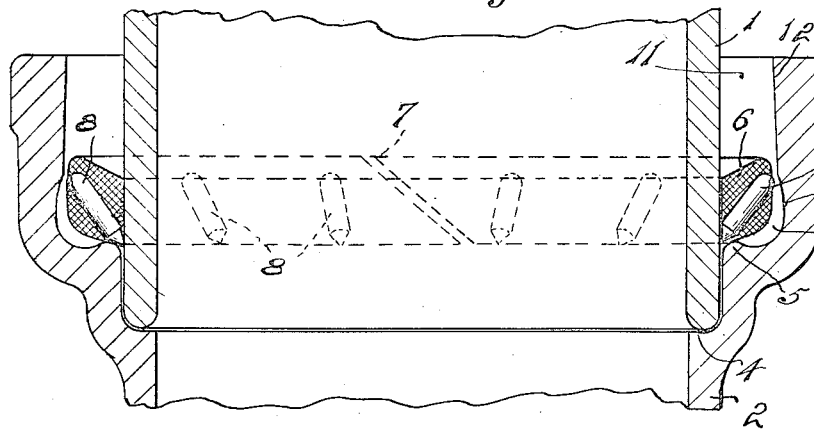
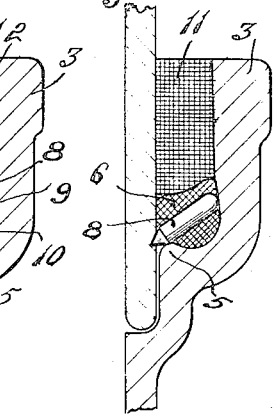
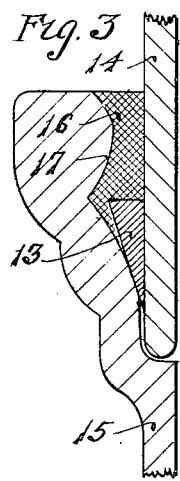
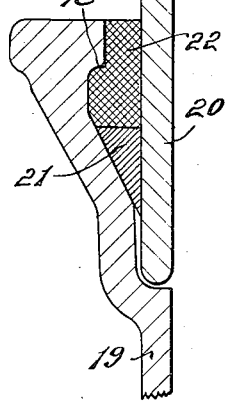
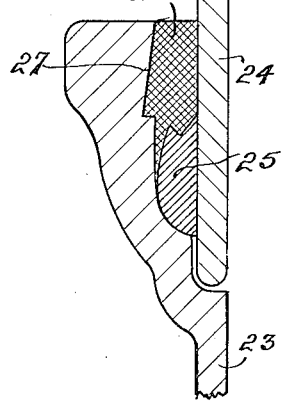
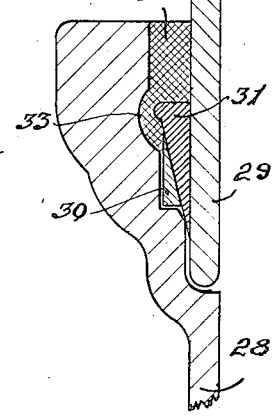
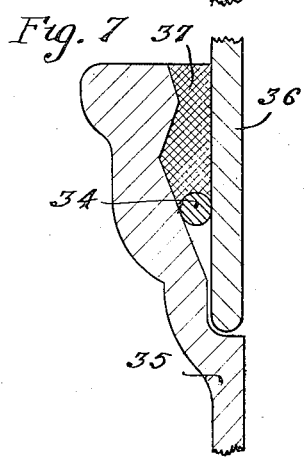

UNITED STATES PATENT OFFICE.

IRA A. MANN, OF PITTSBURGH, PENNSYLVANIA; MARION P. MANN EXECUTRIX OF SAID IRA A. MANN, DECEASED.

PIPE CONNECTION.

1,277,975.   Specification of Letters Patent.   Patented Sept. 3, 1918.

Application filed August 17, 1915. Serial No. 45,863.

*To all whom it may concern:*

Be it known that I, IRA A. MANN, a citizen of the United States, residing at Pittsburgh, in the county of Allegheny and State of Pennsylvania, have invented certain new and useful Improvements in Pipe Connections, of which the following is a specification.

The invention relates to pipe connections and particularly to connections for use with cast iron pipe wherein poured lead or similar metal is employed. The principal objects of the invention are; the provision of an improved joint wherein the use of oakum or similar packing material (and subject to deterioration) for preventing the access of the melted lead to the interior of the piping is avoided; the provision of a permanent durable packing means for preventing the melted lead employed from running into the interior of the piping; the provision of a packing means which will securely hold the two pipe members from working away from each other as the structure in which the pipes are located settles, or as the pipes expand and contract under changes of temperature; the provision of a packing which will not work out of the joint under changes in temperature conditions as above specified; the provision of a packing adapted to give an extended bearing surface at the joint and so support the pipes against bending out of alinement; and the provision of a packing which is cheap, which can be used with the ordinary pipe lacking a bead at its end, and which can be very easily applied. Certain embodiments of the invention are illustrated in the accompanying drawings, wherein—

Figure 1 is a vertical section through one type of joint with the parts in the position occupied before the packing ring is wedged into position and before the application of the poured metal, Fig. 2 is a section through the same construction as Fig. 1 but with the joint completed by forcing the packing ring into its final position and applying the melted packing metal over such ring, and Figs. 3 to 7 are partial sections through modifications.

Referring to Fig. 1, 1 and 2 are pipes of cast iron between which the connection is to be made, the pipe 2 being provided with the hub 3. The hub 3 is provided with a shoulder 4 against which the end of the pipe 1 abuts and is also provided with a stop member 5 whose purpose will be later explained.

Fitting slidably over the end of the pipe 1 is a packing ring 6 preferably of relatively soft metal, such as lead or composition material, although hemp or other fibrous material might be used, such packing ring being split as indicated at 7 so as to render the one ring applicable to several different sizes of pipe. Embedded in the ring at intervals as indicated in Fig. 1, are a series of pins 8 preferably of hard metal such as steel, and having their inner ends pointed.

In making the joint the parts are first assembled as indicated in Fig. 1, with the packing ring 6 fitting around the end of the pipe 1. The next step is the wedging of the ring 6 down into the position indicated in Fig. 2, such operation being accomplished by means of a suitable tamping tool. During this operation the angularity of the pins 8 is changed due to the fact that the downward movement of their inner ends is stopped by the annular stop member 5 while their outer ends are free to move downward until they come opposite the overhang 9 at the upper edge of the enlargement 10. The body portion of the ring 6 fits down into the recess 10 being forced tightly into position by means of the tamping tool, after which soft metal, preferably in molten form, is applied to form the secondary packing 11.

The packing ring 6 not only serves to prevent the removal of the pipe 1 but also serves as a stopper preventing any of the molten metal 11 from flowing down into the interior of the pipes. The arrangement also gives an extended bearing between the two pipes tending to prevent their bending out of alinement and thus forming a bent or rough place upon the interior of the piping. The points of the steel pins 8 indent the surface of the pipe 1 while the outer ends of the pins take against the overhang 9 so that it is impossible for the two pipes to move away from each other. The pins are held against movement from their final position not only by the overhang 9 but also by the packing 11, the surface 12 of the hub being preferably made on an incline, as illustrated, in order to prevent the packing from working outward. The packing is also prevented from working outward by reason of the fact that the pipes themselves cannot move in and out, such in and out movement of connected pipes being the main cause of soft metal packing working out of joints of this general character. The packing ring 6 is not subject to deterioration as is the case with the oakum which is now commonly employed at the inner portion of pipe joints in order to form a seal and prevent the molten lead from flowing to the interior of the pipes. Other advantages of the construction will be readily apparent to those skilled in the art.

Fig. 3 illustrates a modification in which a metal packing ring 13 of hard material, such as iron, is employed at the joint of the pipe members 14 and 15. This ring is preferably split, as in the other type of construction, and is driven tightly into position before the molten packing metal 16 is applied. The hub member is provided with an overhang 17 to prevent the packing material from working outward. The ring 13 not only serves as a seal to prevent the melted lead from running into the piping but also locks the pipes 14 and 15 against movement away from each other. The ring also serves to prevent the pipes from bending out of alinement.

Fig. 4 illustrates a modification in which a different form of overhang 18 is employed, the pipe members 19 and 20 being substantially the same as in the construction of Fig. 3 and the packing ring 21 and soft packing 22 also being similar aside from slight changes in configuration.

In the construction of Fig. 5 the pipes 23 and 24 are connected by means of the iron ring 25 and the lead packing 26, and the overhang is secured by means of the inclination 27 tending to prevent the packing from working out of the joint.

In the construction of Fig. 6 the pipes 28 and 29 are connected by means of the pair of opposing wedge-shaped rings 30 and 31 and the lead packing 32, a recess 33 being provided to prevent the lead from working outward.

Fig. 7 illustrates still another modification in which a ring 34, circular in cross-section, serves as the wedging means between the pipes 35 and 36, the lead packing 37 being applied as in the other forms of connection.

What I claim is:

1. In combination in a pipe joint, a pipe, a hub into which the pipe fits with the hub wall spaced away from the wall of the pipe, hard metal locking means tightly wedged into the inner portion of the space between the said walls and locking the pipe and hub against relative longitudinal movement and a poured metal packing in the outer portion of said space, the hub being provided with an internal shoulder against which the end of the pipe abuts with a portion of reduced diameter outward from said shoulder loosely fitting the end of the pipe and holding the pipe and hub in alinement.

2. In combination in a pipe joint, a pipe, a hub into which the pipe fits with its wall spaced away from the wall of the pipe, a packing ring in the space between the said walls, and hard metal pins embedded in the ring and inclined with respect to the axis of the pipe.

3. In combination in a pipe joint, a pipe, a hub into which the pipe fits with its wall spaced away from the wall of the pipe, a packing ring composed of soft metal in the space between the said walls, and hard metal pins embedded in the ring and inclined with respect to the axis of the pipe, the inner ends of the pins being pointed.

4. In combination in a pipe joint, a pipe, a hub into which the pipe fits with its wall spaced away from the wall of the pipe, a packing ring composed of soft metal in the space between the said walls, and hard metal pins embedded in the ring and inclined with respect to the axis of the pipe, the inner portion of the said space having an enlarged diameter to receive the ring and pins when forced down into wedging position.

5. In combination in a pipe joint, a pipe, a hub into which the pipe fits with its wall spaced away from the wall of the pipe, a packing ring composed of soft metal in the space between the said walls, and hard metal pins embedded in the ring and inclined with respect to the axis of the pipe, the inner ends of the pins being pointed, and a stop member being provided on the hub at the lower end of the said space to engage the ends of the pins adjacent their points.

6. In combination in a pipe joint, a pipe, a hub into which the pipe fits with its wall spaced away from the wall of the pipe, a packing ring composed of soft metal in the space between the said walls, and hard metal pins embedded in the ring and inclined with respect to the axis of the pipe, the inner portion of the said space having an enlarged diameter to receive the ring and pins when forced down into wedging position, and a stop member being provided at the lower end of the said space opposite the inner ends of the pins.

7. In combination in a pipe joint, a pipe, a hub into which the pipe fits with its wall spaced away from the wall of the pipe, a packing ring composed of soft metal in the space between the walls, hard metal pins in the ring inclined with respect to the axis of the pipe, and a soft metal packing in the outer portion of said space.

8. In combination in a pipe joint, a pipe, a hub into which the pipe fits with its wall spaced away from the wall of the pipe, a packing ring composed of soft metal in the space between the walls, hard metal pins in the ring inclined with respect to the axis of the pipe, and a soft metal packing in the outer portion of said space, the inner ends of said pins being pointed so as to indent the surface of the pipe when the ring is forced to its innermost position.

9. In combination in a pipe joint, a pipe, a hub into which the pipe fits with its wall spaced away from the wall of the pipe, a packing ring composed of soft metal in the space between the said walls, and hard metal pins embedded in the ring and inclined with respect to the axis of the pipe, the inner ends of the pins being pointed, and the inner wall of the hub being inclined to engage the outer ends of the pins and prevent their outward movement when the ring is forced down into wedging position.

10. As an article of manufacture, a soft metal packing ring and hard metal pins embedded therein inclined toward the axis of the rings.

11. As an article of manufacture, a soft metal packing ring and hard metal pins embedded therein inclined toward the axis of the ring, and having their inner ends pointed.

12. As an article of manufacture, a packing ring of relatively soft material, and hard metal pins embedded therein inclined toward the axis of the ring and having their inner ends pointed.

IRA A. MANN.